US010565213B2

United States Patent
Lau et al.

(10) Patent No.: US 10,565,213 B2
(45) Date of Patent: Feb. 18, 2020

(54) METHODS AND SYSTEMS FOR IDENTIFYING SIMILAR SCHOOLS

(71) Applicant: Microsoft Technology Licensing, LLC, Redmond, WA (US)

(72) Inventors: Gloria Lau, Los Altos, CA (US); Jacob Bank, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/063,053

(22) Filed: Mar. 7, 2016

(65) Prior Publication Data

US 2016/0188605 A1    Jun. 30, 2016

Related U.S. Application Data

(63) Continuation of application No. 13/647,004, filed on Oct. 8, 2012, now Pat. No. 9,317,875.

(51) Int. Cl.
| | |
|---|---|
| *G06F 16/30* | (2019.01) |
| *G06F 16/2457* | (2019.01) |
| *G06F 16/248* | (2019.01) |
| *G06Q 30/02* | (2012.01) |
| *G06Q 50/00* | (2012.01) |
| *G06Q 50/20* | (2012.01) |

(52) U.S. Cl.
CPC ...... *G06F 16/24578* (2019.01); *G06F 16/248* (2019.01); *G06Q 30/0282* (2013.01); *G06Q 50/01* (2013.01); *G06Q 50/2053* (2013.01)

(58) Field of Classification Search
CPC .......... G06F 17/3053; G06F 17/30554; G06Q 30/0282; G06Q 50/01; G06Q 50/2053

USPC ........................................................ 707/758
See application file for complete search history.

(56) References Cited

U.S. PATENT DOCUMENTS

| | | | |
|---|---|---|---|
| 3,610,902 | A | 10/1971 | Rahenkamp et al. |
| 6,073,138 | A | 6/2000 | de l'Etraz et al. |
| 7,213,019 | B1 | 5/2007 | Angulo Noris et al. |
| 8,756,236 | B1 | 6/2014 | Procopio et al. |
| 8,892,630 | B1 | 11/2014 | Curtis |
| 9,031,888 | B2 | 5/2015 | Lawrence et al. |
| 9,317,875 | B2 | 4/2016 | Lau et al. |

(Continued)

OTHER PUBLICATIONS

"U.S. Appl. No. 13/647,004, 312 Amendment filed Mar. 1, 2016", 11 pgs.

(Continued)

*Primary Examiner* — Hicham Skhoun
(74) *Attorney, Agent, or Firm* — Schwegman Lundberg & Woessner, P.A.

(57) ABSTRACT

Method, apparatus, and a computer-readable storage device for determining similarities. A plurality of sets having social network service members as entities is constructed by associating each of the social network service members with each of a predetermined selection of professional outcomes by school of graduation of the member. One of the plurality of sets is selected. A similarity algorithm calculates the similarity score of at least some of the plurality of sets in the plurality of sets to the selected one of the plurality of sets, and presents for rendering the k sets in the plurality of sets with the highest similarity scores. The similarity algorithm used may be a cosine similarity algorithm using the sets as vectors.

18 Claims, 5 Drawing Sheets

(56) References Cited

U.S. PATENT DOCUMENTS

| | | |
|---|---|---|
| 2007/0219938 A1 | 9/2007 | Boersma et al. |
| 2008/0215623 A1 | 9/2008 | Ramer et al. |
| 2009/0081629 A1 | 3/2009 | Billmyer et al. |
| 2009/0280465 A1* | 11/2009 | Schiller ............... G06Q 10/10 434/350 |
| 2009/0287738 A1* | 11/2009 | Colbran ............... G06Q 50/20 |
| 2010/0159437 A1 | 6/2010 | German et al. |
| 2010/0312713 A1 | 12/2010 | Keltner |
| 2012/0095991 A1 | 4/2012 | Ferrari et al. |
| 2012/0159301 A1 | 6/2012 | Ramamurthy et al. |
| 2012/0185472 A1 | 7/2012 | Ahmed et al. |
| 2012/0244510 A1* | 9/2012 | Watkins, Jr. ............ G09B 7/00 434/362 |
| 2012/0323497 A1 | 12/2012 | Swaminathan et al. |
| 2013/0031090 A1 | 1/2013 | Posse et al. |
| 2013/0063769 A1 | 3/2013 | Kawabe et al. |
| 2013/0232159 A1* | 9/2013 | Daya ..................... G06Q 50/01 707/758 |
| 2014/0052663 A1* | 2/2014 | Kelley ............... G06Q 30/0282 705/347 |
| 2014/0101143 A1 | 4/2014 | Zhang et al. |
| 2014/0101186 A1 | 4/2014 | Lau et al. |
| 2014/0129477 A1 | 5/2014 | Lau et al. |
| 2014/0129552 A1 | 5/2014 | Sinha et al. |
| 2014/0156652 A1 | 6/2014 | Abiola |

OTHER PUBLICATIONS

"U.S. Appl. No. 13/647,004, Examiner Interview Summary dated Oct. 15, 2015", 3 pgs.
"U.S. Appl. No. 13/647,004, Final Office Action dated Jul. 14, 2015", 14 pgs.
"U.S. Appl. No. 13/647,004, Non Final Office Action dated Feb. 13, 2015", 16 pgs.
"U.S. Appl. No. 13/647,004, Non Final Office Action dated Aug. 29, 2014", 16 pgs.
"U.S. Appl. No. 13/647,004, Notice of Allowance dated Dec. 8, 2015", 11 pgs.
"U.S. Appl. No. 13/647,004, PTO Response to Rule 312 communication dated Mar. 11, 2016", 2 pgs.
"U.S. Appl. No. 13/647,004, Response filed May 13, 2015 to Non-Final Office Action dated Feb. 13, 2015", 15 pgs.
"U.S. Appl. No. 13/647,004, Response filed Oct. 12, 2015 to Final Office Action dated Jul. 14, 2015", 17 pgs.
"U.S. Appl. No. 13/647,004, Response filed Dec. 1, 2014 to Non Final Office Action dated Aug. 29, 2014", 18 pgs.
"U.S. Appl. No. 13/647,027, Advisory Action dated Aug. 7, 2015", 4 pgs.
"U.S. Appl. No. 13/647,027, Examiner Interview Summary dated Feb. 10, 2016", 4 pgs.
"U.S. Appl. No. 13/647,027, Final Office Action dated Apr. 30, 2015", 23 pgs.
"U.S. Appl. No. 13/647,027, Final Office Action dated Jun. 30, 2016", 19 pgs.
"U.S. Appl. No. 13/647,027, Non Final Office Action dated Sep. 4, 2014", 24 pgs.
"U.S. Appl. No. 13/647,027, Non Final Office Action dated Nov. 18, 2016", 20 pgs.
"U.S. Appl. No. 13/647,027, Response filed Mar. 4, 2015 to Non-Final Office Action dated Sep. 4, 2014", 23 pgs.
"U.S. Appl. No. 13/647,027, Response filed Mar. 15, 2016 to Non Final Office Action dated Jan. 12, 2016", 19 pgs.
"U.S. Appl. No. 13/647,027, Response filed Sep. 30, 2016 to Final Office Action dated Jun. 30, 2016", 12 pgs.
"U.S. Appl. No. 13/647,027, Response filed Jul. 30, 2015 to Final Office Action dated Apr. 30, 2015", 14 pgs.
"U.S. Appl. No. 13/708,770, Examiner Interview Summary dated Mar. 15, 2016", 3 pgs.
"U.S. Appl. No. 13/708,770, Final Office Action dated Aug. 12, 2016", 26 pgs.
"U.S. Appl. No. 13/708,770, Response filed Apr. 26, 2016 to Non Final Office Action dated Jan. 14, 2016", 28 pgs.
"Best Law School Rankings—Law Program Rankings", US New & World Report, [Online]. Retrieved from the Internet: <URL: http://grad-schools.usnews.rankingsandreviews.com/best-graduate-schools/top-law-schools/law-rankings>, (2013), 3 pgs.
"Top MBA Programs—Best Business Schools Resources", US New & World Report, [Online]. Retrieved from the Internet: <URL: http://grad-schools.usnews.rankingsandreviews.com/best-graduate-schools/top-business-schools>, (2013), 3 pgs.
Allen, Walter R., "The Color of Success: African-American College Student Outcomes at Predominantly White and Historically Black Public Colleges and Universities", Harvard Educational Review 62, 1,, (1992), 26-44.
Ayers, Elizabeth, et al., "Skill Set Profile Clustering Based on Student Capability Vector Computed From Online Tutoring Data", Educational Data Mining 2008: 1st International Conference on Educational Data Mining, Proceedings., (2008), 210-217.
Ben-Yitzhak, Ori, et al., "Beyond Basic Faceted Search", WSDM'08, (2008), 11 pgs.
Brewer, D., et al., "Does it pay to attend and elite private college? Cross-cohort evidence on the effects of college type on earnings", The Journal of Human Resources 34(1), (1999), 104-123.
Card, David, et al., "School Resources and StudentOutcomes: An Overview of theLiterature and New Evidence fromNorth and South Carolina", Journal of Economic Perspectives—vol. 10, No. 4, (Fall 1996), 31-50.
Carnoy, Martin, et al., "Does External Accountability Affect Student Outcomes? A Cross-State Analysis", Educational Evaluation and Policy Analysis vol. 24, No. 4, (Winter 2002), 305-331.
Cullen, Julie, et al., "The Impact of School Choice on Student Outcomes: An Analysis of the Chicago Public Schools", Journal of Public Economics 89, (2005), 729-760.
Dichev, Ilia, "News or Noise? Estimating the Noise in the U.S.News University Rankings", Research in Higher Education,vol. 42,No. 3, (2001), 237-266.
Ding, Chanfu, et al., "The Relationship Between University Ranks and Outcomes Measurement", The College Teaching Methods & Styles Journal. vol. 3 (2,2nd Quarter), (2007), 1-10.
Ehrenberg, Ronald G., "Method or Madness? Inside the U.S. News &World Report College Rankings", Journal of College Admission, 189, [Online]. Retrieved from the Internet: <URL: http://digitalcommons.ilr.cornell.edu/cgi/viewcontent.cgi?article=1708 &context=articles, (Oct. 1, 2005), 29-35.
Eide, Eric, et al., "Does it pay to attend an elite private college? Evidence on the effects of undergraduate college quality on graduate school attendance", Economics of Education Review, vol. 17, No. 4, [Online]. Retrieved from the Internet: <URL: http://nersp.osg.ufl.edu/~lombardi/edudocs/eide.pdf>, (1998), 371-376.
English, Jennifer, et al., "Hierarchical Faceted Metadata in Site Search Interfaces", CHI 2002, [Online]. Retrieved from the Internet: <http://flamenco.berkeley.edu/papers/chi02_short_paper.pdf>, (Feb. 9, 2012), 2 pgs.
Griffith, A., et al., "The In?uence of the US News and World Report Collegiate Rankings on the Matriculation Decision of High-ability Students:1995-2004", Economics of Education Review 26,2, (2007), 244-255.
Hearst, Marti A, "Design Recommendations for Hierarchical Faceted Search Interfaces", ACM SIGIR Workshop on Faceted Search, (Aug. 2006), 5 pgs.
Kozak, Esteban, "Find people faster with LinkedIn's new faceted search", LinkedIn Offical Blog, [Online]. Retrieved from the Internet: <URL: http://blog.linkedin.com/2009/12/14/linkedin-faceted-search/>, (Dec. 14, 2009), 3 pgs.
Manning, C, et al., "Vector Space Classification", Introductions to Information Retrieval, Cambridge University Press, (2008), 289-291.
Mullan, Fitzhugh, et al., "The Social Mission of Medical Education: Ranking the Schools", Ann Intern Med. 2010:152(12), (Jun. 15, 2010), 804-811.

(56) References Cited

OTHER PUBLICATIONS

Nugent, Rebecca, et al., "Skill Set Profile Clustering: The Empty K-Means Algorithm with Automatic Specification of Starting Cluster Centers", Educational Data Mining 2010: 3rd International Conference on Educational Data Mining, Proceedings., (2010), 151-160.
Tunkelang, Daniel, "Dynamic Category Sets: An Approach for Faceted Search", SIGIR '06 Workshop on Faceted Search Conference, (Aug. 10, 2006), 5 pgs.
Vedder, Richard, et al., "An Outcomes Based Assessment of Universities, Using Who's Who in America", A Policy Paper from the Center for College Affordability and Productivity, [Online]. Retrieved from the Internet: <URL: http://www.issuelab.org/resource/outcomes_based_assessment_of_universities>, (Mar. 2008), 24 pgs.
U.S. Appl. No. 13/647,027, filed Oct. 8, 2012, Methods and Systems for Obtaining and Presenting Alumni Data.
U.S. Appl. No. 13/708,770, filed Dec. 7, 2012, Methods and Systems for Ranking Entities.
U.S. Appl. No. 13/647,004 U.S. Pat. No. 9,317,875, filed Oct. 8, 2012, Methods and Systems for Identifying Similar Schools.
"U.S. Appl. No. 13/647,027, Response filed Apr. 18, 2017 to Non Final Office Action dated Nov. 18, 2017", 17 pgs.
"U.S. Appl. No. 13/708,770, Non Final Office Action dated Mar. 9, 2017", 27 pgs.
"U.S. Appl. No. 13/708,770, Response filed Feb. 13, 2017 to Final Office Action dated Aug. 12, 2016", 24 pgs.
"Best Medical Schools—Top Medical Schools for Research", US New & World Report, [Online]. Retrieved from the Internet: <URL: http://grad-schools.usnews.rankingsandreviews.com/best-graduate-schools/top-medical-schools/research-rankings?int=85a732>, (2013), 3 pgs.
"U.S. Appl. No. 13/647,027, Advisory Action dated Nov. 13, 2017", 3 pgs.
"Applicant Initiated Interview Summary Issued in U.S. Appl. No. 13/647,027", dated Aug. 27, 2018, 4 Pages.
"Final Office Action Issued in U.S. Appl. No. 13/647,027", dated Nov. 20, 2018, 14 Pages.
"Non Final Office Action Issued in U.S. Appl. No. 13/647,027", dated May 17, 2018, 14 Pages.
Bekkerman, et al., "High-Precision Phrase-Based Document Classification on a Modern Scale", In Proceedings of the 17th ACM SIGKDD International Conference on Knowledge Discovery and Data Mining, Aug. 21, 2011, pp. 231-239.
Huynh, et al., "Parallax and Companion: Set-based Browsing for the Data Web", In Proceedings of WWW Conference, vol. 61, May 8, 2009, 10 Pages.
"Final Office Action Issued in U.S. Appl. No. 13/647,027", dated Jul. 20, 2017, 23 Pages.
"Non Final Office Action Issued in U.S. Appl. No. 13/647,027", dated Jan. 12, 2016, 21 Pages.
"Final Office Action Issued in U.S. Appl. No. 13/708,770", dated Oct. 18, 2017, 19 Pages.
"Non Final Office Action Issued in U.S. Appl. No. 13/708,770", dated Jan. 14, 2016, 17 Pages.
Hearst, et al., "Faceted Metadata for Information Architecture and Search", In Course at SIGCHI, Conference on Human Factors in Computing Systems, Apr. 24, 2006, 90 Pages.
"Response Issued in U.S. Appl. No. 13/708,770", filed Jul. 10, 2017, 27 Pages.

* cited by examiner

METHODS AND SYSTEMS FOR IDENTIFYING SIMILAR SCHOOLS

RELATED APPLICATIONS

This application is a Continuation of U.S. patent application Ser. No. 13/647,004, filed Oct. 8, 2012, which is incorporated herein by reference in its entirety.

TECHNICAL FIELD

The present disclosure generally relates to data processing systems and techniques for processing and presenting content within an online social network environment. In specific examples, the present disclosure relates to methods and systems for analyzing and aggregating education information, such as degrees achieved and universities at which degrees were achieved by individual members of a social network service, so as to present the aggregated information in an interactive manner that enables members of the social network service to explore a wide variety of university information and options when deciding on a university to attend; job outcomes by graduates of schools are also aggregated to enable users to determine likely job outcomes based on schools attended.

BACKGROUND

A social network service is a computer- or web-based application that enables its members to establish links or connections with persons for the purpose of sharing information with one another. In general, a social network service enables people to memorialize or acknowledge the relationships that exist in their "offline" (i.e., real-world) lives by establishing a computer-based representation of these same relationships in the "online" world. Many social network services require or request that each member provide personal information about the member, such as professional information including information regarding their educational background, employment positions that the member has held, and so forth. This information is frequently referred to as "profile" information, or "member profile" information. In many instances, social network services enable members, with the appropriate data access rights, to view the personal information (e.g., member profiles) of other members. Although such personal information about individual members can be useful in certain scenarios, it may not provide many insights into "big picture" questions about various professions, careers, and individual jobs or employment positions, and in particular the formal education that is often required to achieve certain career aspirations.

DESCRIPTION OF THE DRAWINGS

Some embodiments are illustrated by way of example and not limitation in the Figures of the accompanying drawings, in which.

DETAILED DESCRIPTION

Figure 1:
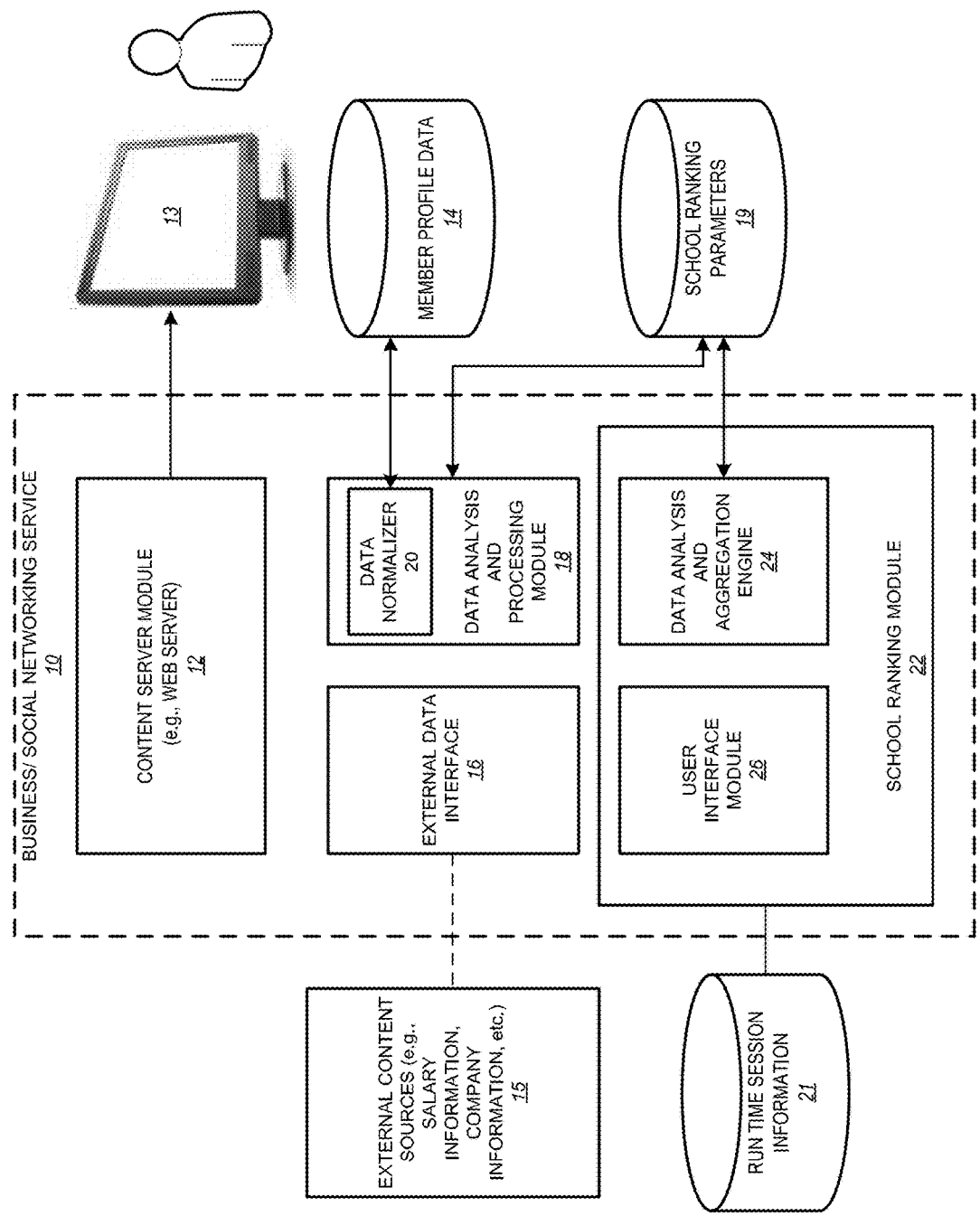
FIG. 1 is a functional block diagram illustrating various functional modules or components of a social/business network service, with which an embodiment described herein might be implemented.

Methods and systems for determining similarity among entities are described. Similarity among schools is used as an example. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Many social network services, and particularly those with a professional or business focus, request or even require users to provide various items of personal information, including information concerning a user's educational background, employment history and career. For example, a user may be prompted to provide information concerning the schools and universities attended, the dates or years of attendance, the subject matter concentration (e.g., academic concentration or major), as well as the professional certifications and/or academic degrees that the user has obtained. As used herein, the term "schools" is used in the sense of educational institutions such as universities, community colleges, high schools, trade schools and any other organization where students are engaged in learning. Similarly, a user may be prompted to provide information concerning the companies for which he or she has worked, the employment positions (e.g., job titles) held, the dates of such employment, the skills obtained, and any special recognition or awards received. The data that is requested and obtained may be structured, or unstructured. Other information may be requested and provided as well, such as a professional summary, which summarizes a user's employment skills and experiences, or an objective or mission statement, indicating the user's professional or career aspirations. For purposes of this disclosure, the above-described data or information is generally referred to as member profile data or member profile information. Furthermore, each individual item of data or information may be referred to as a member profile attribute.

Consistent with some embodiments of the invention, a social network service includes a school similarity information aggregation service, which is referred to hereinafter as the "school similarity module" or "school similarity application." Consistent with some embodiments, the school similarity application analyzes and aggregates the member profile information of all (or some subset of) members of the social network service to provide a rich and easy to access set of tools that enable members and other users to explore and discover a variety of similarity information, and possibly trends, concerning various schools as they relate to industries, professions, employments positions, and/or actual career outcomes based on member profile data. For example, in some embodiments, the system identifies similar sets of members which are useful for a number of functions from recommending other universities to prospective students, to analyzing fields of study, to finding organizations and clubs within a specific school, to getting help with school work. The data of the social network service is used to create a representation of sets of members and then identify the most similar sets of members in the population.

Specifically, each member is represented by his or her professional outcome (e.g., current job title and industry), found on the member's social network service profile. Then a similarity function may be used to identify similar university departments and similar universities from the sets of members. Stated another way, the similarity functions described herein compare disjoint sets of students by the common metric of professional outcome to draw conclusions about sets of students, creating aggregations of many students, instead of treating each student individually. The disclosed school similarity application enables a user to generate and view a graphical representation of schools that are similar in a field of study, or of schools that are similar to a given school. The school similarity application enables a user to create or map a group of schools similar to a given school.

As described herein, schools are ranked by evaluating how well they produce a wide variety of desirable postgraduate outcomes, including degrees from graduate and professional schools, and positions in specific industries and roles. Using data from a professional social network on tens of millions of American professionals, the ranking system creates individual rankings of schools, comparing schools by how likely their students are to achieve specific outcomes.

With some embodiments, the school similarity application includes certain resources particularly useful for those who may be considering education prospects for the first time. For example, with some embodiments, a member can select a school, or a particular department within that school, and view information relating to schools that are similar to that particular school.

A user interface or web page (e.g., a School Page, University Page, or College Page) may be constructed for each educational institution from the data obtained by the social network service, which may show ranking of the institution by companies that hired its graduates (in this context, graduates may be viewed as members of the social network service), to job functions of graduates, to geographical locations in which graduates are working. Such a user interface is disclosed in U.S. patent application Ser. No. 13/647,027 entitled "Methods and Systems for Obtaining And Presenting Alumni Data," filed Oct. 8, 2012, and assigned to the assignee of the instant patent. Such user interface may illustrate where the college fits in rankings of colleges, career outcomes data of the college's graduates, number of students that are interested in attending, number of students and alumni that are members of the social network service, and conversations in which people are engaging about the school in various chat feeds. The results of the school similarity application may be placed on the college page with links from the college page to each of the similar schools. Therefore if a prospective student is looking to select a college, the prospective student accesses the school page for that university and can explore not only career outcomes data but also see what similar schools are for career outcome, and at the same time listen to the chat conversations with respect to the school.

FIG. 1 is a functional block diagram illustrating various functional modules or components of a social/business network service 10, with which an embodiment of the invention might be implemented. The various functional modules illustrated in FIG. 1 may be embodied in hardware, software, or a combination thereof. Furthermore, although shown in FIG. 1 as a single set of modules, a skilled artisan will appreciate that with some embodiments, the individual components may be distributed amongst many server computers, forming a distributed, cluster-based architecture. In addition, as presented in FIG. 1, the school similarity application is represented as a module 22 integral with the social network service 10. In other embodiments, the school similarity application may be a separate web-based application that simply uses one or more sets of application programming interfaces (APIs) to leverage one or more separately hosted social network services.

As illustrated in FIG. 1, the social network service 10 includes a content server module (e.g., a web server module) 12 configured to send and receive information (e.g., web pages, or web-based content) with various web-based communication protocols to various client applications and devices, including web browser applications and/or other content rendering applications. With some embodiments, users interact with the service 10 via a web browser application, or some other content rendering application, that resides and executes on a client computing device, such as that with reference number 13 in FIG. 1. Client computing devices may include personal computers, as well as any of a wide number and type of mobile devices, such as laptop computers, tablet computers, mobile phones, and so forth. By interacting with the client computing device, a user can request and receive web pages from the service 10. With some embodiments, the web pages will prompt the user to provide various member profile attribute information (e.g., schools and/or universities attended, academic degrees received, academic majors, employment history information, and so forth), which, is then communicated to the service 10 and stored in a storage device as member profile data 14.

Schools are represented as entities in the social graph of a member. The social graph database is updated to reflect the relationships that a member has to the various companies and educational institutions as that information is provided by the member. For example, when a member indicates that she or he graduated from Harvard, the member's social graph is updated so that a node representing the member will be connected via an appropriate edge type to the node representing the entity, Harvard, where the edge type will indicate the particular relationship (e.g., graduated from). Likewise, when a member indicates that she or he is employed by a given company, the member's social graph is updated so that a node representing the member will be connected, in this instance, to the company. The edge type may indicate current or past employment, as the case may be.

The service 10 includes an external data interface 16 to receive data from one or more externally hosted sources. For instance, with some embodiments, certain information about companies and/or particular job titles or employment positions (e.g., salary ranges) may be obtained from one or more external sources. With some embodiments, such data may be accessed in real-time, while in other embodiments the data may be imported periodically and stored locally at the social network service that is hosting the school similarity application.

With some embodiments, the volume of member profile data that is available for processing is extremely large. Accordingly, as shown in FIG. 1, with some embodiments, the social network service 10 includes a data analysis and processing module 18, which may be offline. With some embodiments, this processing module may be implemented with a distributed computing system, such as Apache™ Hadoop™. The processing module 18 obtains as input various attributes of member profile information, and then processes this information to ensure that is in a usable form for the school similarity application. For instance, the data normalizer module 20 will normalize various elements of data, ensuring that they conform to some standard that is used by the school similarity application. With some embodiments, the various job titles that users specify for themselves are normalized by deduplicating and disambiguating the job titles. For instance, in many cases, the same employment position will have a different job title at different companies. Accordingly, with some embodiments, the data normalizer module 20 will deduplicate job titles by mapping the different job titles, as specified in users' member profiles, to uniquely named job titles for use with the school similarity application. In addition to deduplicating job titles, with some embodiments the data normalizer will disambiguate job titles. For instance, in many cases, a particular job title may be used in two different industries, such that the two employment positions represented by the same job title are really very different. A few examples include the job titles, "associate" and "analyst." A financial analyst may be a completely different position from a security analyst, and so forth. Accordingly, with some embodiments, the data normalizer 20 will analyze various elements of a user's member profile to determine the industry in which the user works, such that the job title for the user can be specified uniquely for that industry.

In addition to normalizing various items of information, with some embodiments, the processing module 18 obtains or otherwise derives a set of school similarity parameters from or based on profile attributes of the members for use in processing similarities as discussed below. At least with some embodiments, these parameters are updated periodically (e.g., daily, nightly, bi-daily, weekly, every few hours, etc.) to take into account changes members make to their profiles.

Similarity parameters are stored for use with the school ranking module 22, as shown in FIG. 1 in a database with reference number 19. With some embodiments, the similarity parameters are stored in a distributed key-value storage system, such as the open sourced storage system known as the Voldemort Project. Also illustrated in FIG. 1 is a data analysis and aggregation engine with reference number 24 which is used to process the school similarly parameters to obtain similarity results as discussed below. At run-time, the school similarity parameters are quickly retrieved, and then used with one or more sets or one or more vectors to determine similarity of schools, which may be provided to a user interface in absolute or weighted format. With some embodiments, the profile attributes specified by the member for use with the school similarity application may be separately stored with run-time session information, as illustrated in FIG. 1 with reference number 21.

As illustrated in FIG. 1, the school similarity module 22 includes a data analysis and aggregation engine 24, and a user interface (UI) module 26. The data analysis and aggregation engine analyzes and aggregates the school similarity parameters as discussed in greater detail below. For example, the aggregation engine constructs vectors or, in some cases, sets, of school similarity parameters and processes them using a similarity function. The user interface module 26 includes logic for presenting the information in various formats, for example, as shown in the example user interfaces presented in the attached figures.

With some embodiments, the school similarity application will pre-compute various items of information, thereby ensuring that the school similarity application provides a real-time experience to users. For example, some information is processed to ensure that it is conditioned for use with the school similarity application. However, with some embodiments, information may be processed in real-time, or, as requested.

Certain attribute information from the member profiles of members of a social network service are retrieved and analyzed for the purpose of normalizing the information for use with the school similarity application. For instance, with some embodiments, job titles may be specified (as opposed to selected) by the members of the social network service and therefore will not be standardized across companies and industries. As such, with some embodiments, a data normalizer module 20 will analyze the profile information from which certain job titles are extracted to ascertain an industry specific job title. Accordingly, with some embodiments, the school similarity application will utilize a set of unique, industry specific job titles. Of course, other attributes may also be normalized when appropriate.

Determining schools that are similar to a given school is accomplished based on the career outcomes of graduates of the schools. As an example, if one were interested in determining schools that are similar to, say, Stanford University, in a given field of study, one would process standardized information relating to career outcomes of graduates in the field of study from Stanford, and process standardized information relating to career outcomes of graduates in that field of study from other universities. The results of the processing, as discussed below, will give a measure of similarity of other schools to Stanford for that field of study.

Similarity processing may have one component or two components. One component uses schools for which sufficient data is available such that the results of the above processing would be statistically significant. For example, Schools with under ten thousand (10,000) graduates may be filtered out as yielding statistically insignificant results.

A separate component would be also to use a different comparison scheme for schools for which the social network service does not have sufficient data for the processing result to be statistically significant. An embodiment could use one or both of the components, dependent on the desire of the operator of the social network service.

In one embodiment, for a given school for which similar schools are desired to be determined, the system may process school similarity parameters relating to members who graduated from the given school against school similarity parameters relating to members who graduated from other schools. For a graduate, or member (called student, "s", in the discussion below), the member's declared industry, the member's current company, the member's functional area, the industry of the member's current company, and member's current position or job title may be aggregated for use in the similarity processing. In a second embodiment the system processes the foregoing information for schools for which the system had enough data to render the results of the processing statistically significant, and also processes information from schools for which the system has less data. Processing may be based on cosine similarity, or other similarity functions such as Jaccard similarity.

In one embodiment, the data processing by data analysis and aggregation engine 24, and by data analysis and processing module 18 may be as follows. Given a set $A=\{S_1, S_2, \ldots, S_m\}$, where each $S_i \in A$ is a set of students $\{s_1, s_2, \ldots, s_n\}$, and another set of students $\hat{S}$, and the k sets in A that are most similar to $\hat{S}$.

The first step to find sets similar to $\hat{S}$ is representing each student s as a professional outcome from social network service member data. In the data, each member on the social network service is associated by processing in data analysis and processing module 18 with certain professional attributes from the member's profile in member profile data 14, as may be desired. The natural representation of a social network service member for this task is simply the set of these professional attributes with which the member is associated. So a single student s is processed by data analysis and processing module 18 to be represented as the set $\{i, c, f, ci, t\}$ where i is the member's declared industry, c is the member's current company, f is the member's functional area, ci is the industry of the current company c, and t is the member's current title. Using this base definition of a student, the sections below describe three different methods to find the k sets in A most similar to $\hat{S}$.

Cosine Similarity

In a first approach the processing by data analysis and aggregation engine 24 represents $S_i$ not as a set of attributes, but as a vector $V_i$, which is a histogram over the appearances of the individual attributes. So $V_i = \{count(i_1), \ldots, count(c_1) \ldots\}$ where $count(i_1)$ is the number of students $s \in S_i$ that work in industry $i_1$. Then, for each $S_i$ in A, using histogram vector $V_i$, the similarity score with $\hat{S}$ can be calculated by data analysis and aggregation engine 24 as a simple $$\text{cosine} = \frac{\hat{V} \cdot V_i}{\|\hat{V}\| * \|V_i\|}.$$

Again, the algorithm completes by outputting the k sets in A with the highest scores, ranking schools by similarity.

Jacquard Similarity

A second similarity metric simple represents each set $S_i$ as the set $S'_i$ of all professional attributes covered by the students in $S_i$, or $S'_i = I \cup C \cup F \cup CI \cup T$, where I is all industries present in S, C is all companies, F is all functional areas, CI is all company industries, and T is all titles. Then, for each $S_i \in A$ the similarity score with $\hat{S}$ can simply be calculated using the $$\text{Jacquard Index} = \frac{|S'_i \cap \hat{S}'|}{|S'_i \cup \hat{S}'|}.$$

Finally the algorithm outputs the k sets in A with the highest scores.

In each example, for a small sample of student sets, each of the above algorithms creates a ranked list of similar sets. The ranked results are then evaluated using average precision at k described by Manning, C., Raghavan, P., and Schutze, H, *Introductions to Information Retrieval*. Cambridge University Press, 2008.

Similar Computer Science Departments

In a first example, the task is to identify the most similar computer science departments to the computer science departments at ten (10) major U.S. universities: Cornell University, Stanford University, University of Wisconsin-Madison, UCLA, Harvard University, UC Berkeley, University of Texas-Austin, Princeton University, Carnegie Mellon University, and University of Washington. The goal of such a comparison is to inform prospective students of other schools they should consider in a given field. Each department is represented by the set of social network service members that received bachelor's degrees in computer science from that university. In one embodiment, schools with under one hundred (100) such students are filtered out due to sparsity concerns, and the remaining six-hundred twenty-six schools range between 100 and 5,381 students. For each of the ten schools, any of the above two similarity algorithms may be used to output the top ten most similar schools. Table I shows a sample of the similarity rankings of each of the two algorithms for Stanford University.

TABLE I

Similar Computer Science Departments to Stanford University

| Position | Cosine | Jaccard |
|---|---|---|
| 1. | MIT | Cornell University |
| 2. | UC Berkeley | Carnegie Mellon University |
| 3. | Carnegie Mellon University | Princeton University |
| 4. | Brown University | UC San Diego |
| 5. | Dartmouth College | UCLA |
| 6. | Cornell University | University of Southern California |
| 7. | Rice University | MIT |
| 8. | Princeton University | UC Davis |
| 9. | Harvey Mudd College | University of Pennsylvania |
| 10. | University of California, Santa Barbara | Cal Poly-SLO |

Based on k plotted for each of the similarity algorithms for computer science departments, it was found that cosine similarity seems to be the best by a small margin, followed by Jaccard.

Similar Universities

In a second example the task is to identify similar universities to the ten universities used above, again from the perspective of informing prospective students. As before, a school is represented by the set of all social network service members that received bachelor's degrees from the school. In one embodiment, schools with under 10,000 students were filtered out, leaving two-hundred eleven schools ranging in number of bachelor's degree holders from 10,005 to 83,677. Again, for each of the ten schools, the algorithms output the ten most similar schools. Table II shows a sample of the rankings for Cornell University.

TABLE II

Similar Universities to Cornell University

| Position | Cosine | Jaccard |
|---|---|---|
| 1. | Tufts University | Rutgers |
| 2. | University of Pennysylvania | University of Michigan |
| 3. | Columbia University | University of Pennsylvania |
| 4. | Vanderbilt University | Boston University |
| 5. | Princeton University | University of Virginia |
| 6. | Duke University | Penn State University |
| 7. | Brown University | University of California, Berkeley |
| 8. | Dartmouth College | University of Notre Dame |
| 9. | Tulane University | University of Massachusette, Amherst |
| 10. | Brandeis University | Washington University in St. Louis |

Based on k precision calculations, Cosine was stronger than Jacquard by a larger margin than in the computer science task, though the statistical significance of the differences depend on the size of the test set. This increased difference between the vector based methods and the set based method likely come from the larger data sets involved in the school similarity task, making the counts of each professional attribute more important.

The examples above focused on the college decisions for prospective students, both at the department and university level, but one of ordinary skill in the art may envision more applications to which the inventive concepts are applicable. At the university level, this method could be used inside a school to analyze student organizations, fraternities, and sports teams. Even earlier than the postsecondary level, this type of analysis can be used to compare schools, or even school districts in terms of long term outcomes. Having sets of similar students for all of these examples can provide key insights to students, in terms of which groups they would like to be a part of, and to administrators, to implement new educational techniques and judge the effects.

Further, representation of a student will be able to expand far beyond the five professional attributes used to characterize a student in this work. For example, social network service's skills on a user's profile would make an excellent additional feature in the representation of a student, but the data should not be too sparse to be used in a general technique. Beyond this relatively simple addition, one can imagine adding many more complex features based on a user's activity patterns of sharing and reading content, and even the structure of a user's social graph.

Results can also be presented as a weighted average of similarity among schools. As identified in the example above there are five professional attributes with which a member is associated, i, c, f, ci, and t. The results may then also be presented as a weighted average. For example, instead of listing the positions from 1 to 10 in Table I, each school's similarity to Stanford may be given by a weighted average with, say, for Cosine similarity (first column, Table I), UC Berkeley might be a 4.2, Carnegie Mellon University might be a 3.8, and so on, with the higher the similarity score the more school has in common with Stanford, in the current example.

Another part of the processing may be to separate the fields with respect to degrees obtained from the member's university. For example, if a member obtains an associate degree, a bachelor's degree, a master's degree, a Ph.D, an MD, or a JD, the members may be separated into six buckets each corresponding to the degree earned, and perform the similarity function with respect to corresponding groups and make a weighted average of these. That is, if Stanford produced one-thousand bachelor's degrees and two master's degrees among members in a given field, the system does not merely add them together.

The second component alluded to above are the cases for schools where the social network service does not have enough data for the results to be statistically significant. One example is comparing a medical school with a college of a university, and there are two members in the medical school and one member in the college. In this situation a different approach is used which is called attribute-based similarity. Attribute-based similarity is based on attributes such as field of study, degree programs offered, location of the school, tuition, whether the school is private school, whether the school is a public school, whether the school is a four-year college or two-year college, and the like. Again, similarity, such as any of the above similarity functions may be used, processing a vector based on the above attributes, much like i, c, f, ci, and t used in the first component discussed above. This can provide similarity for the schools for which the social network service does not have sufficient data for use in the first component, above. Stated another way, the first component provides similarity based on career outcomes while the second component provides similarity based on school attributes. Since new members are joining the social network service continually, and current members are updating their profile continually, including updating their education from time to time, schools that are in the attributes-based category will move to career based outcomes category. Those of ordinary skill in the art will recognize that some embodiments may use some combination of the above approaches.

Figure 2:
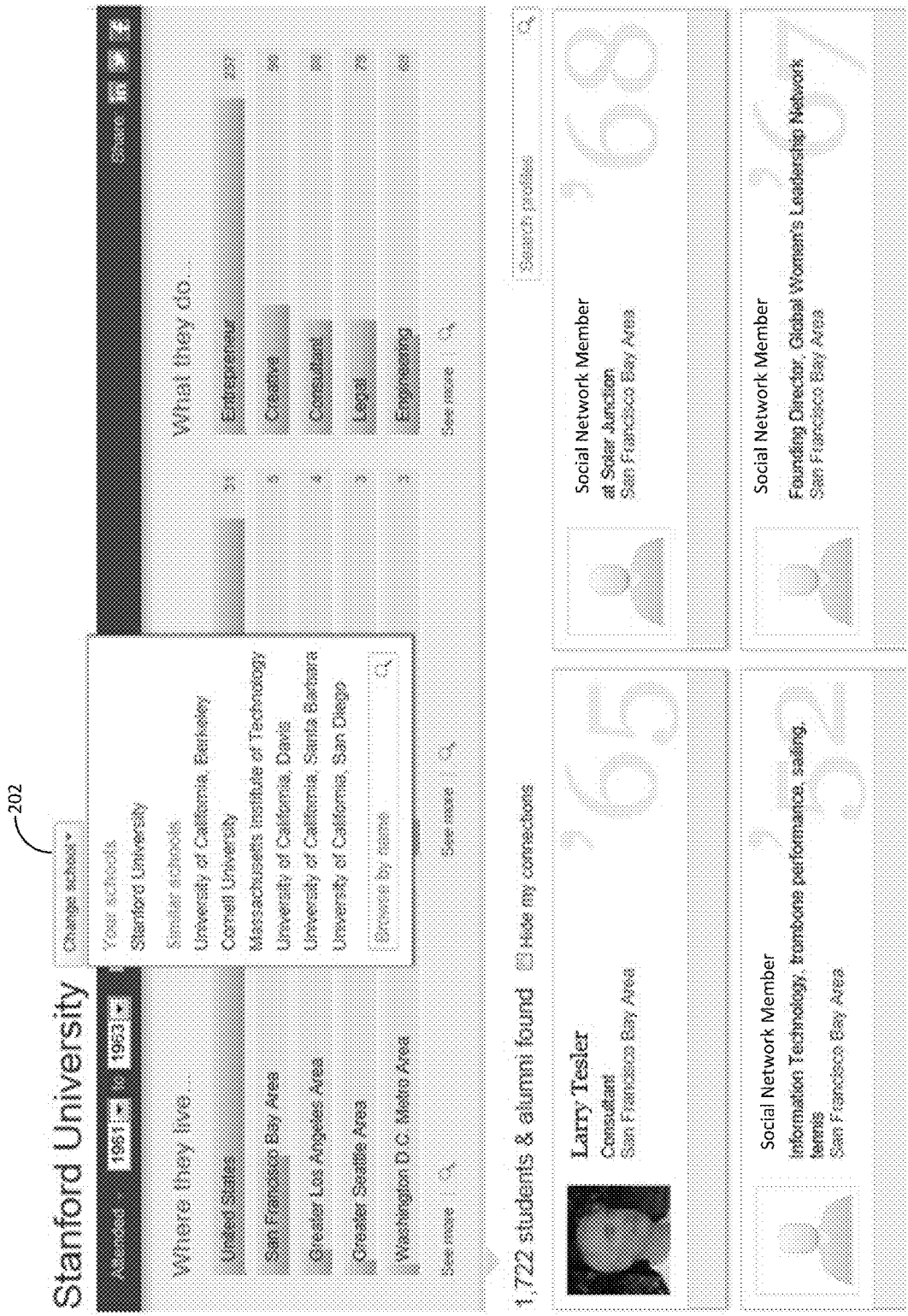
FIG. 2 is an illustration of a user interface useful in an embodiment.

FIG. 2 illustrates a user interface useful in an embodiment. In this illustration, the user may access a university alumni page that shows graduates, Where They Live, Where They Work, and What They Do. By associating school similarity with such a page a user can see schools that are similar to that university. For example, in FIG. 2, an alumni page for Stanford University has been accessed. By clicking on the Change School drop down menu 202, the user can, because of the school similarity association, view schools that are similar to Stanford University. Here, using the method discussed above, it is seen that schools that are similar to Stanford University are University of California, Berkeley, Cornell University, Massachusetts institute of Technology, University of California, Davis, University of California, Santa Barbara, and University of California, San Diego. While six similar schools have been presented, more or fewer similar schools may be presented.

Figure 3:
FIG. 3 is an illustration of another user interface useful in an embodiment.
Figure 4:
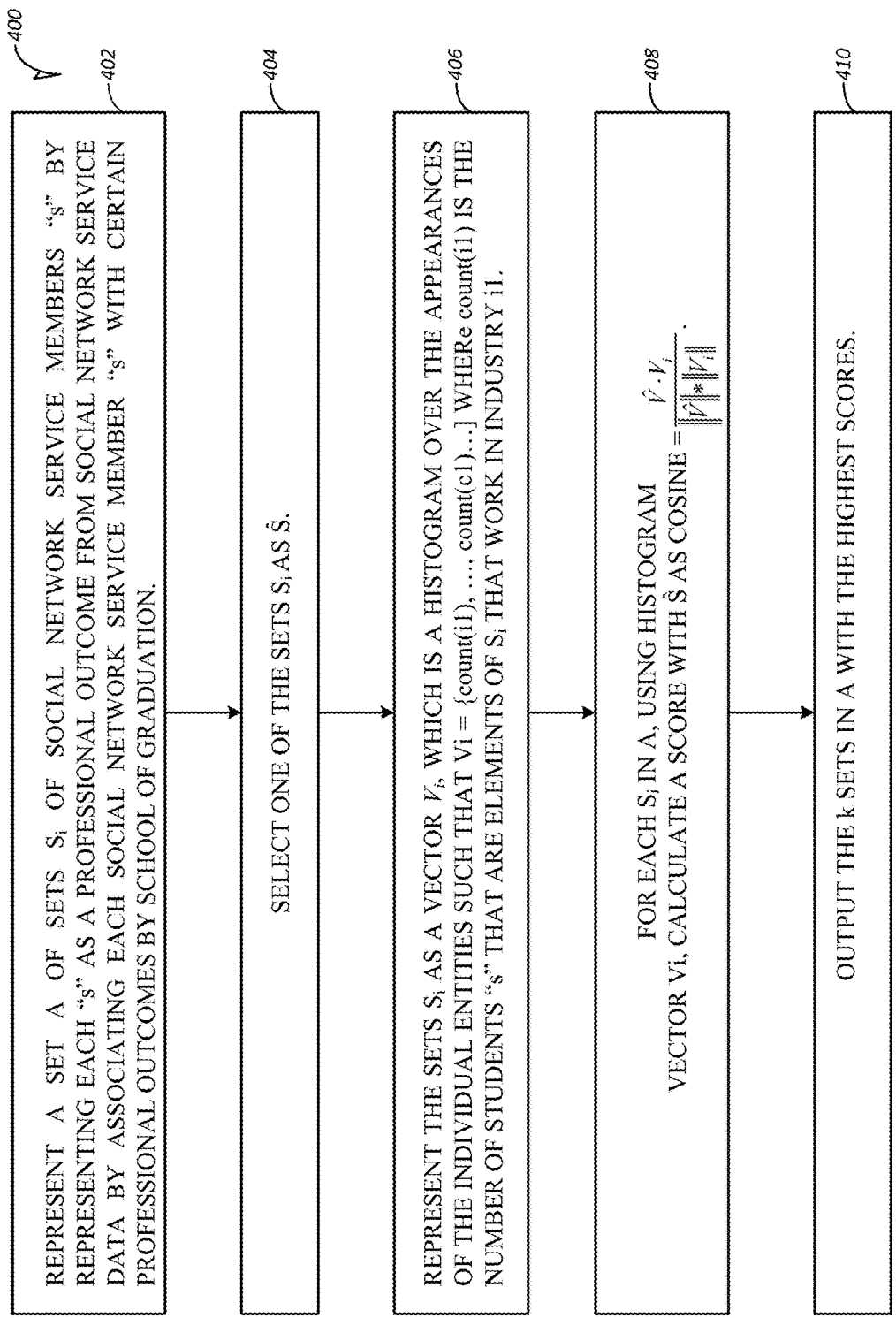
FIG. 4 is an illustration of a flow chart describing operation of an embodiment.

In addition, school similarity can be associated with a school page as discussed above. This enables a prospective college student looking to select a college to access the school page for the University of choice, explore career outcomes data for the university, and see which similar schools offer similar career outcomes. As an example, FIG. 3 illustrates a school page for Skidmore University. The school page gives substantial information about the university including, at 300, a presentation of similar schools which have been associated with the school page much the same as has been discussed above with respect to FIG. 2. Further, while learning of certain of the schools similar to Skidmore, the prospective student can listen in to the 34 new conversations in the current week at 302.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
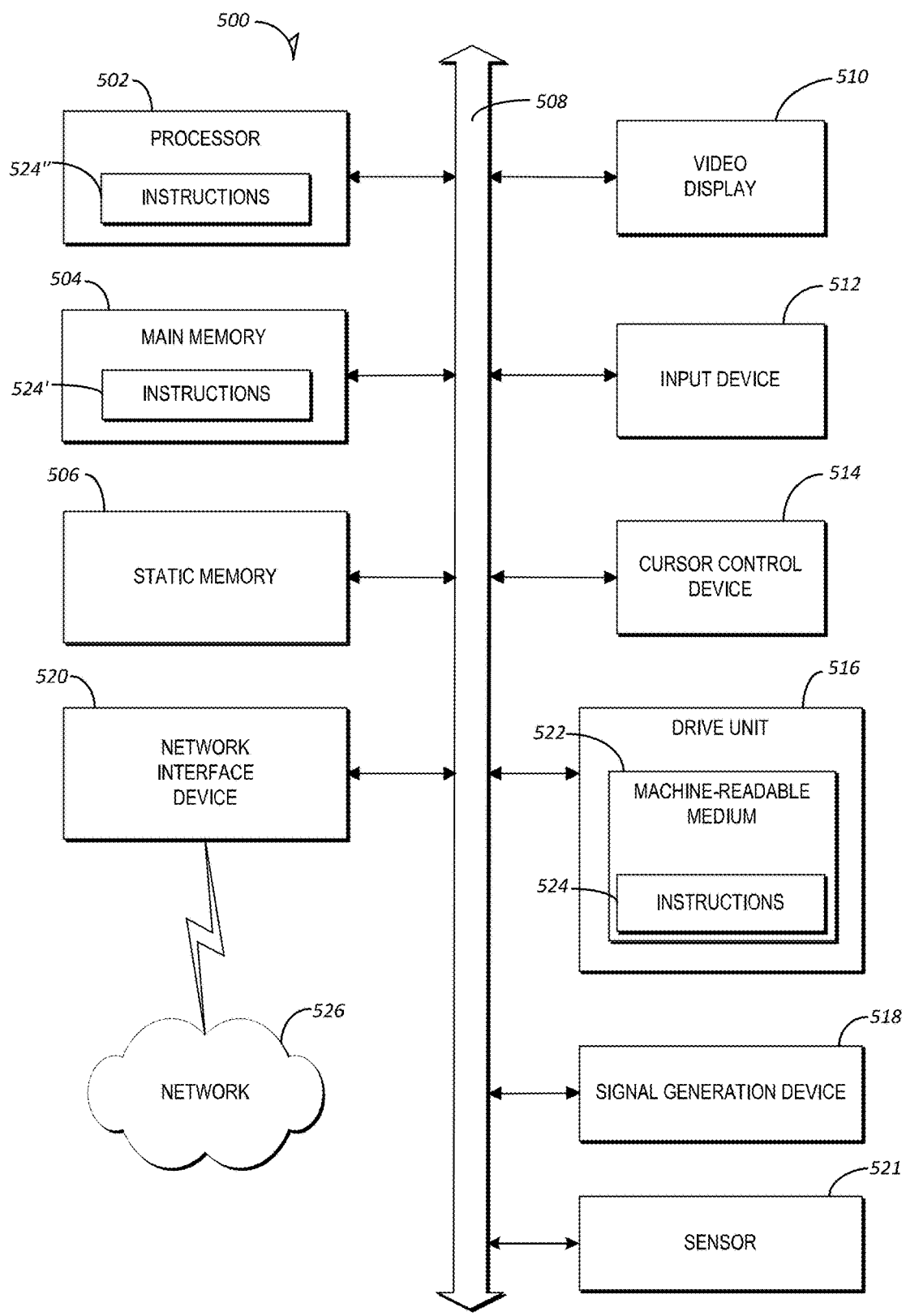
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a. Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display 510, an input device 512 (e.g., a keyboard), and a cursor control device 514 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 521, such as a global positioning system sensor, compass, accelerometer, or other sensor.

The drive unit 516 includes a machine-readable medium 522 on which is stored one or more sets of instructions and data structures (e.g., instructions 524) embodying or utilized by any one or more of the methodologies or functions described herein. The instructions 524 may also reside, completely or at least partially (indicated as 524' and 524", respectively), within the main memory 504 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 524, 524', 524" may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
using one or more computer processors, constructing, for each respective school from a set of schools, a set of professional outcomes for the respective school, the set of professional outcomes constructed based on information included in a plurality of user profiles of a social networking service, the information including an identity of schools of graduation and professional outcome information for users of the social networking service, the professional outcome information indicating a current job title and industry for each of the users of the social networking service;
receiving, by the one or more computer processors, from an interactive user interface, a selection of a first school from the set of schools, the first school identified by a user of the interactive user interface;
calculating, from information in the user profiles and the set of professional outcomes for each respective school, a set of similarity scores for the first school, each respective similarity score from the set of similarity scores indicating a level of similarity between the first school and one other respective school from the set of schools based on how likely students at the one other respective school are to achieve professional outcomes from the set of professional outcomes for the first school, wherein calculating each respective similarity score comprises:
determining a first value indicating a percentage of graduates of the one other respective school that achieved a first professional outcome from the set of professional outcomes;
comparing the first value to a second value indicating a percentage of graduates of the first school that achieved the first professional outcome, yielding a comparison, wherein the respective similarity score is based on the comparison;
ranking the respective schools based on the set of similarity scores for the first school; and
generating a visual representation based on the ranking the visual representation indicating respective schools from the set of schools that are determined to be similar to the first school, the representation rendered on the interactive user interface, wherein the user can view names of the respective schools that are similar to the first school, on the interactive user interface.

2. The method of claim 1 wherein calculating the set of similarity scores comprises:
representing the set of professional outcomes for each respective school as a vector Vi which is a histogram over the appearances of the individual users of the set of professional outcomes such that Vi={count (i1) . . . count (c1) . . . } where count (i1) is the number of users that have the professional outcome i1; and
for each set of professional outcomes, calculating, using the Vector Vi, a similarity score with another set of professional outcomes that comprises information of users that graduated from a selected school.

3. The method of claim 1 wherein the set of professional outcomes comprise at least one of a user's declared industry of employment, the user's current company of employment, the user's functional area of employment, the industry of the user's current company of employment, or the user's current employment title.

4. The method of claim 1 wherein each user appears in exactly one of the sets of professional outcomes.

5. The method of claim 1 wherein each set of professional outcomes comprise one of, graduating from a department of a university, receiving a graduate degree from a graduate school, receiving a degree from a professional school or obtaining a position in a specific industry.

6. The method of claim 1 wherein the interactive user interface is a school page for the first school.

7. A system comprising:
one or more computer processors; and
one or more non-transitory computer-readable mediums storing instructions that, when executed by the one or more computer processors, cause the system to perform operations comprising:
constructing, for each respective school from a set of schools, a set of professional outcomes for the respective school, the set of professional outcomes constructed based on information included in a plurality of user profiles of a social networking service, the information including an identity of schools of graduation and professional outcome information for users of the social networking service, the professional outcome information indicating a current job title and industry for each of the users of the social networking service;
receiving, from an interactive user interface, a selection of a first school from the set of schools, the first school identified by a user of the interactive user interface;
calculating, from information in the user profiles and the set of professional outcomes for each respective school, a set of similarity scores for the first school, each respective similarity score from the set of similarity scores indicating a level of similarity between the first school and one other respective school from the set of schools based on how likely students at the one other respective school are to achieve professional outcomes from the set of professional outcomes for the first school, wherein calculating each respective similarity score comprises:
determining a first value indicating a percentage of graduates of the one other respective school that achieved a first professional outcome from the set of professional outcomes;
comparing the first value to a second value indicating a percentage of graduates of the first school that achieved the first professional outcome, yielding a comparison, wherein the respective similarity score is based on the comparison;
ranking the respective schools based on the set of similarity scores for the first school; and
generating a visual representation based on the ranking the visual representation indicating respective schools from the set of schools that are determined to be similar to the first school, the representation rendered on the interactive user interface, wherein the user can view names of the respective schools that are similar to the first school, on the interactive user interface.

8. The system of claim 7, wherein calculating the set of similarity scores comprises:
representing the set of professional outcomes for each respective school as a vector Vi which is a histogram over the appearances of the individual users of the set of professional outcomes such that Vi={count (i1) . . . count (c1) . . . } where count (i1) is the number of users that have the professional outcome i1; and
for each set of professional outcomes, calculating, using the Vector Vi, a similarity score with another set of professional outcomes that comprises information of users that graduated from a selected school.

9. The system of claim 7, wherein the set of professional outcomes comprise at least one of a user's declared industry of employment, the user's current company of employment, the user's functional area of employment, the industry of the user's current company of employment, or the user's current employment title.

10. The system of claim 7, wherein each user appears in exactly one of the sets of professional outcomes.

11. The system of claim 7, wherein each set of professional outcomes comprise one of, graduating from a department of a university, receiving a graduate degree from a graduate school, receiving a degree from a professional school or obtaining a position in a specific industry.

12. The system of claim 7, wherein the interactive user interface is a school page for the first school.

13. A non-transitory computer-readable medium storing instructions that, when executed by one or more computer processors of a computing system, cause the computing system to perform operations comprising:

constructing, for each respective school from a set of schools, a set of professional outcomes for the respective school, the set of professional outcomes constructed based on information included in a plurality of user profiles of a social networking service, the information including an identity of schools of graduation and professional outcome information for users of the social networking service, the professional outcome information indicating a current job title and industry for each of the users of the social networking service;

receiving, from an interactive user interface, a selection of a first school from the set of schools, the first school identified by a user of the interactive user interface;

calculating, from information in the user profiles and the set of professional outcomes for each respective school, a set of similarity scores for the first school, each respective similarity score from the set of similarity scores indicating a level of similarity between the first school and one other respective school from the set of schools based on how likely students at the one other respective school are to achieve professional outcomes from the set of professional outcomes for the first school, wherein calculating each respective similarity score comprises:

determining a first value indicating a percentage of graduates of the one other respective school that achieved a first professional outcome from the set of professional outcomes;

comparing the first value to a second value indicating a percentage of graduates of the first school that achieved the first professional outcome, yielding a comparison, wherein the respective similarity score is based on the comparison;

ranking the respective schools based on the set of similarity scores for the first school; and generating a visual representation based on the ranking the visual representation indicating respective schools from the set of schools that are determined to be similar to the first school, the representation rendered on the interactive user interface, wherein the user can view names of the respective schools that are similar to the first school, on the interactive user interface.

14. The non-transitory computer-readable medium of claim 13, wherein calculating the set of similarity scores comprises:

representing the set of professional outcomes for each respective school as a vector $V_i$ which is a histogram over the appearances of the individual users of the set of professional outcomes such that $V_i=\{\text{count}(i1) \ldots \text{count}(c1) \ldots\}$ where count $(i1)$ is the number of users that have the professional outcome $i1$; and for each set of professional outcomes, calculating, using the Vector $V_i$, a similarity score with another set of professional outcomes that comprises information of users that graduated from a selected school.

15. The non-transitory computer-readable medium of claim 13, wherein the set of professional outcomes comprise at least one of a user's declared industry of employment, the user's current company of employment, the user's functional area of employment, the industry of the user's current company of employment, or the user's current employment title.

16. The non-transitory computer-readable medium of claim 13, wherein each user appears in exactly one of the sets of professional outcomes.

17. The non-transitory computer-readable medium of claim 13, wherein each set of professional outcomes comprise one of graduating from a department of a university, receiving a graduate degree from a graduate school, receiving a degree from a professional school or obtaining a position in a specific industry.

18. The non-transitory computer-readable medium of claim 13, wherein the interactive user interface is a school page for the first school.

* * * * *